March 7, 1950 — L. ZAIGER — 2,499,809
WINDSHIELD WIPER
Filed Aug. 27, 1945
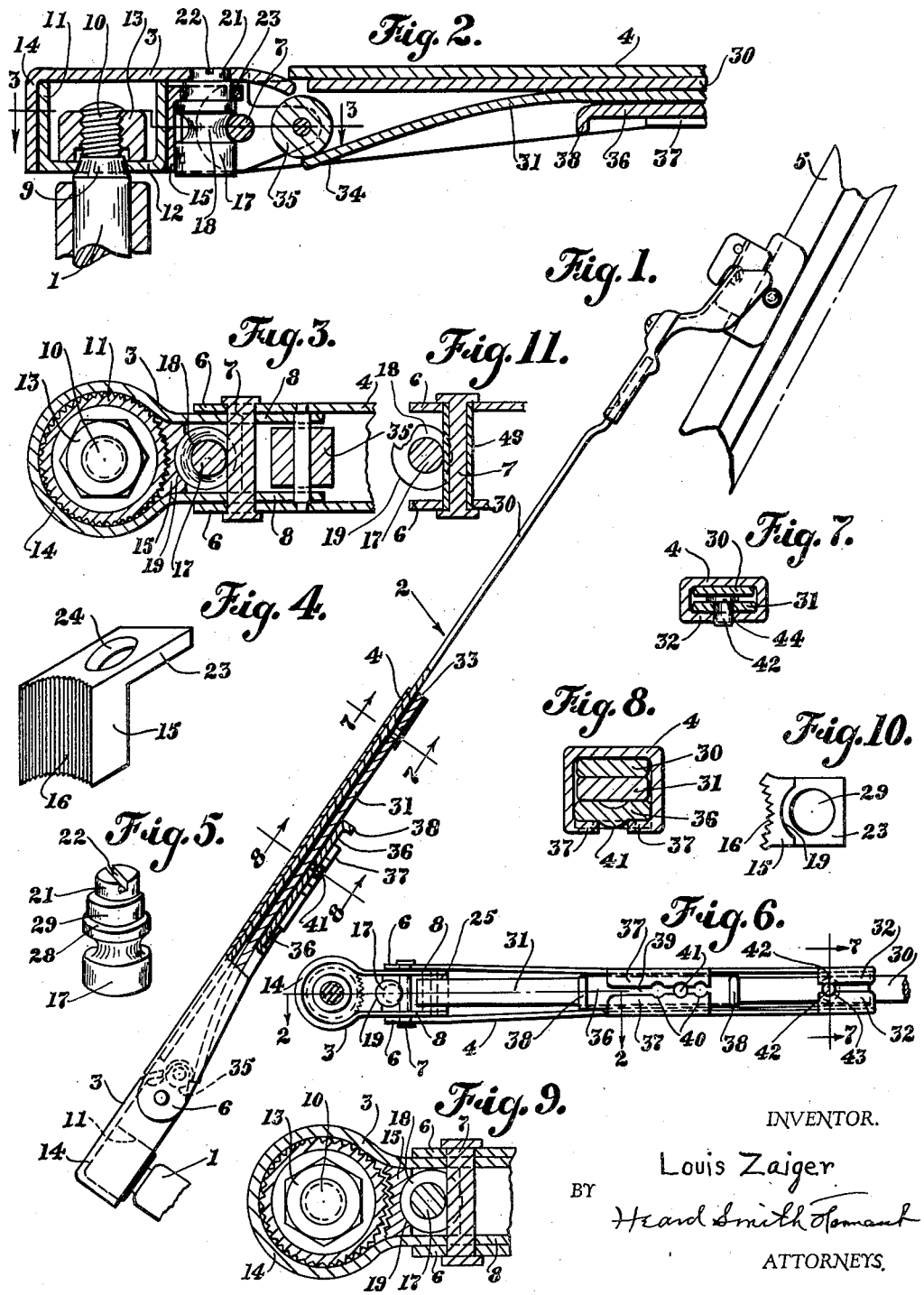
INVENTOR.
Louis Zaiger
BY Heard Smith Tomant
ATTORNEYS.

Patented Mar. 7, 1950

2,499,809

UNITED STATES PATENT OFFICE 2,499,809

WINDSHIELD WIPER

Louis Zaiger, Lynn, Mass.

Application August 27, 1945, Serial No. 612,756

8 Claims. (Cl. 287—53)

This invention relates to windshield wipers, and has for one of its objects to provide novel means for detachably securing the wiper arm to the actuating shaft.

Other objects of the invention are to improve windshield wipers in various particulars as will be more fully hereinafter set forth.

In the drawings:

Fig. 1 is a side view partly in section showing a windshield wiper embodying my invention.

Fig. 2 is an enlarged section on the line 2—2, Fig. 6.

Fig. 3 is a section on the line 3—3, Fig. 2, showing the locking member in operative position.

Fig. 4 is an enlarged perspective view of the locking member.

Fig. 5 is a perspective view of the cam member.

Fig. 6 is an underside view of the inner end of the wiper arm.

Fig. 7 is an enlarged view on the line 7—7, Figs. 1 and 6.

Fig. 8 is a section on the line 8—8, Fig. 1.

Fig. 9 is a fragmentary sectional view showing the locking member in unlocked position.

Fig. 10 is an underside view of the locking member.

Fig. 11 is a fragmentary view illustrating a different embodiment of the invention.

In the drawings 1 indicates the usual actuating shaft on which the windshield wiper arm is mounted and 2 indicates generally the wiper arm, the latter comprising the inner arm section 3 which is detachably secured to the actuating shaft 1 and the outer arm section 4 to the outer end of which is secured the usual wiper element 5.

The arm sections 3 and 4 are channel shaped in cross section and the arm section 4 is formed at its inner end with two extending cheek pieces 6 which receive between them the outer end of the inner arm section 3, said arm sections being pivotally connected together in usual manner by a pivot pin 7 which extends through the side walls 8 of the inner arm section and through the cheek pieces 6 of the outer arm section.

The actuating shaft 1 is shown as provided adjacent its outer end with a tapered shoulder 9 having a serrated surface and with an exteriorly screw threaded end portion 10 of reduced diameter.

Said actuating shaft carries at its outer end a bushing or hub member 11 which is herein shown as cup shaped and the bottom 12 of which is provided with an aperture through which the reduced end 10 of the actuating shaft extends. This hub member 11 is clamped firmly against the shoulder 9 by means of a nut 13 which is screw threaded to the screw threaded end 10 and is received within the cup shaped hub member 11.

The exterior surface of this hub member is usually serrated or provided with fine grooves extending parallel to the shaft axis.

The inner end 14 of the inner arm section 3 is shaped to present a hood portion which encircles and receives the hub member 11, said hood portion being of a size to fit freely over the hub 11.

As stated above one of the objects of the present invention is to provide novel means for detachably locking or clamping the inner arm section 3 to the hub member 11. The locking means which I have herein illustrated comprise a locking member 15 which is received within the inner arm section 3 and has a curved face 16 which engages the exterior face of the hub member 11, said curved face preferably being provided with serrations which are complemental to the serrations with which the hub member is provided.

Situated between the locking member 15 and the pivot pin 7 is a cam member which is preferably constructed so that it can be actuated from the exterior of the inner arm section, said cam member being so constructed that by its turning movement it forces the locking member 15 bodily toward and into clamping or interlocking engagement with the hub member 11, thereby firmly locking or securing the wiper arm to the actuating shaft.

Furthermore, the construction of the locking member 15 and the cam member is such that the cam member is retained in its operative position by the pivot pin 7 and the locking member in turn is retained in its operative position by the cam member.

The cam member, which is indicated generally at 17, is provided at its upper end with a neck portion 21 that is received in an opening in the bridge portion of the inner arm section 3, and the body of the cam member is also formed with a circumferential groove 18 in which the pivot pin 7 is received. The bottom of the groove 18 and the neck 21 are concentric and have a common axis about which the cam member is turned and which extends at right angles to the pivot pin. The body of the cam member is eccentric to the axis thereof and bears against the locking member, the latter having a concave side face 19 which fits the eccentric face of the cam. At the upper end of the cam member there is a reduced cam surface 29 which is also eccentric to the axis of said cam member and which forms with the body of the cam member a shoulder 28 as best seen in Fig. 5.

The locking member 15 is formed at its upper end with a horizontal flange 23 having an aperture 24 of a size to receive the cam portion 29 of the cam member, said flange resting on the shoulder 28.

The upper end of the cam member which is exposed on the outside of the wiper arm is shown as provided with a screw driver slot 22 by which the cam can be turned.

When the cam member is turned in one direction, the eccentric or cam portions thereof operate against the locking member to force the latter into locking engagement with the hub 11, and during this camming action, the cam member bears against and is backed by the pivot pin 7.

When the cam member is turned in the other direction, the eccentric cam portion 29 operating in the opening in the flange 23 will serve to withdraw the locking member from its locking engagement.

It will be noted that the pivot pin 7 constitutes an abutment against which the cam member bears during its camming action and therefore in moving the locking member forward the cam has in effect a wedging action between the pivot pin 7 and the locking member.

Said pivot pin 7 not only acts as a bearing for the cam member during its camming action, but since it is located in the groove 18, it serves as a means for holding the cam in position. Furthermore the engagement of the flange 23 of the locking member with the shoulder 28 of the cam member serves to hold the locking member in position.

In this construction, therefore, the locking pin holds the cam member in position and in turn the cam member holds the locking member in position.

The cam member may conveniently be so made that a quarter turn thereof about its axis will be sufficient to clamp the locking member firmly into engagement with the hub member or to release it therefrom.

In windshield wiper arms of the type herein illustrated the outer arm section 4 is usually provided with some suitable spring means which operates to yieldingly press the wiper element 5 against the glass. Some times this spring is in the form of a leaf spring which is anchored at its outer end to the outer wiper arm section and at its inner end bears against an abutment member, some times in the form of a roll, which is carried by the inner arm section.

In the present construction there is provided a fulcrum member which is carried by the outer arm section and is situated to engage the spring at an intermediate point, the construction being such that the spring is flexed over the fulcrum member thereby giving the wiper element the desired spring pressure against the glass.

There is also provided means for adjusting this fulcrum member thereby to vary the tension of the spring.

The outer wiper arm section 4 is channel shaped and the wiper element 5 is carried by an extension member 30 which is adjustable longitudinally in the outer arm section 4. The leaf spring above referred to is indicated at 31. It is enclosed within the channel shaped outer arm section 4 and is firmly anchored thereto at its outer end. For this purpose, the side walls of the channel shaped arm member 4 are provided with extensions 32 which are bent in underneath the outer end 33 of the leaf spring 31 thereby firmly anchoring said leaf spring in position. The inner end 34 of the leaf spring bears against an abutment member in the form of a roll 35 which is carried by the inner arm section as above described.

36 indicates a fulcrum member which engages the spring 31 intermediate of its ends. This said fulcrum member is located on the underside of the leaf spring and the side walls of the channel shaped arm section 4 are provided with extensions 37 which are bent around underneath the fulcrum member 36 and thereby hold it securely in place. The fulcrum member 36 can be moved longitudinally of the spring 31 and the ends 38 of the fulcrum member are bent downwardly to form suitable elements that limit the adjusting movement of said member.

The inner edges 39 of the inturned wings or extensions 37 are provided with a plurality of mating notches 40 and the fulcrum member 36 is provided with a protuberance 41 which is adapted to engage in any one of these notches.

It will be understood that if the fulcrum member 36 is moved toward the outer end of the wiper arm, the biasing action of the spring 31 will be lessened while if it is moved in the opposite direction such biasing action will be increased.

The fulcrum member 36 can be adjusted from one position to another by applying pressure to the downturned ears or stop elements 38 and the engagement of the protuberance 41 in the notches 40 serve to retain the fulcrum member in its desired position.

The outer end of the spring 31 is provided with a headed pin or stud 42 which extends through the spring with the head 44 of the pin on the inside of the spring and bearing against the arm extension 30. The shank of this pin 42 is received in notches 43 formed on the edges of the inturned portions 32, the engagement of the pin with said notches serving to hold the spring 31 from movement in the direction of its length.

I propose to make the pin 42 of brass or some other metal which has a reduced frictional engagement with the material of the extension 30 providing for relatively easy movement of the extension 30 when it is desired to extend or contract the over all length of the wiper arm. The frictional engagement of the head 44 with the extension 30, however, is sufficient to retain the extension in any adjusted position.

If desired I may employ a sleeve 49, which encloses the pivot pin 7 and the ends of which are anchored in the side walls 6 of the outer arm section as shown in Fig. 11. In this construction the sleeve is received in the groove 18 of the cam member and the purpose of the sleeve is to relieve the pivot pin from later strain due to the camming action involved in moving the locking member into its operative position. In this form of the invention the pivot pin 7 and the sleeve 49 constitute the pivot connections between the inner arm section 3 and the outer arm section 4 while in the construction shown in Figs. 2 and 3 the pivot pin itself constitutes such pivot connections.

I claim:

1. The combination with a wiper-actuating shaft having mounted thereon a cylindrical hub member, of a wiper arm presenting an outer wiper-carrying section and an inner section channel shaped in cross section and provided with a hood portion to receive the hub member, a pivot pin by which the inner and outer sections are pivotally connected together, a locking member situated within the inner arm section and movable into and out of locking engagement with the hub member, and a turnable cam member interposed between said locking member and the pivot pin and contacting with each, whereby turning movement of the cam member operates to force the locking member into clamping engagement with the hub.

2. A combination with a wiper-actuating shaft having rigidly mounted thereon a cylindrical hub member, of a wiper arm presenting an outer wiper-carrying section and an inner section channel shaped in cross section and provided with a hood portion to receive the hub member, a pivot pin by which the inner and outer sections are pivotally connected together, a locking member situated within the inner arm section, and a cam member operatively engaging the locking member and interposed between the latter and the pivot pin and backed by said pivot pin, said cam member being turnable about an axis parallel to that of the shaft and by its turning movement operating to force the locking member into clamping engagement with the hub member.

3. A combination with a wiper-actuating shaft having mounted rigidly thereon a cylindrical hub member, of a wiper arm presenting an outer wiper-carrying section and an inner section channel shaped in cross section and provided with a hood portion to receive the hub member, a pivot pin by which the inner and outer sections are pivotally connected together, a locking member situated within the inner arm section and adapted to have locking engagement with the hub, and a cam member interposed between said locking member and the pivot pin and bearing against the latter, said cam member being turnable about an axis parallel to that of the shaft and also having an interlocking engagement with the pivot pin by which it is retained in position, and further having a cam portion engaging the locking member whereby, turning movement of the cam member operates to force the locking member into clamping engagement with the hub member, said pivot pin serving as a backing for the cam member during its camming action.

4. The combination with a wiper-actuating shaft having a hub member mounted thereon and rigid therewith, of a wiper arm presenting an outer wiper-carrying section and an inner section provided with a hood portion to receive the hub member, a pivot pin by which the said two arm sections are pivotally connected together, said pivot pin extending at right angles to the shaft, a locking member movably carried by the inner arm section and adapted to have locking engagement with said hub member, a cam member interposed between the pivot pin and the locking member and turnable about an axis parallel to said shaft, said cam member having a circumferential groove in which the pivot pin is received and also having a cam portion operatively engaging the locking member and by which it is moved into locking engagement with the hub member as the cam member is turned, said pivot pin serving as a backing for the cam during its camming action and also holding the cam member in operative position.

5. In a windshield wiper, the combination with a wiper actuating shaft having a hub member rigid therewith, of a wiper arm presenting an outer wiper-carrying section and an inner section channel shaped in cross section and having a hood portion to receive the hub member, a pivot pin by which the two sections are pivotally connected, a locking member within the inner arm section, a cam member interposed between the pivot pin and the cam member, said cam member having an operative engagement with the locking member and being backed by the pivot pin, said cam member also having an interlocking connection with the pivot pin by which the latter holds the cam member in position and further having an interlocking engagement by which the locking member is retained in position by the cam member.

6. In a windshield wiper, the combination with a wiper-actuating shaft having a hub member rigid therewith, of a wiper arm presenting an outer wiper-carrying section and an inner section channel shaped in cross section and having a hood portion to receive the hub member, a pivot pin pivotally connecting the two wiper arm sections, a locking member within the inner arm section adapted for locking engagement with the hub member, a cam member interposed between the pivot pin and the locking member and turnable about an axis at right angles to that of the pivot pin, said cam member having a peripheral groove in which the pivot pin is received and the bottom of which is concentric with the axis of the cam member, said cam member also having a concentric neck portion extending through the bridge portion of the inner arm section and accessible from the exterior thereof for turning the cam and further having an eccentric cam portion and an annular shoulder, said locking member having a laterally extending flange provided with an aperture in which said eccentric cam portion of the cam member is received and which rests on said shoulder, whereby turning movement of the cam member moves the locking member into and out of locking engagement with the hub member and the cam member is retained in position by the pivot pin and the locking member is retained in position by the cam member.

7. The combination with a wiper-actuating shaft having mounted thereon a cylindrical hub member, of a wiper arm presenting an outer wiper-carrying section and an inner section channel shaped in cross section and provided with a hood portion to receive the hub member, a pivot pin by which the inner and outer sections are pivotally connected together, a locking member situated within the inner arm section and movable into and out of locking engagement with the hub member, a cam member interposed between the locking member and the pivot pin and having an operative engagement with each, said cam member being turnable about an axis at right angles to the pin and having a circumferential groove in which the pivot pin is received and also having a cam portion operatively engaging said locking member, whereby turning movement of the cam member about its axis moves the locking member into locking engagement with the hub, said pivot pin serving as a backing for the cam member during its camming action.

8. The combination with a wiper-actuating shaft having mounted thereon a cylindrical hub member, of a wiper arm presenting an outer wiper-carrying section and an inner section channel shaped in cross section and provided with a hood portion to receive the hub member, a pivot pin by which the inner and outer sections are pivotally connected together, a locking member situated within the inner arm section and movable into and out of locking engagement with the hub member, a cam member interposed between the locking member and the pivot pin and turnable about an axis at right angles to the pin, said cam member having a circumferential groove in which the pivot pin is received and also having an eccentric cam portion, said locking member having a flange portion provided with an aperture in which said eccentric cam portion of the cam member is received, whereby turning movement of the cam member moves the locking member into and out of locking engagement with the hub, said pivot pin serving as a backing for the cam during such camming action and also serves to hold the cam in its operative position, the engagement of the flange of the locking member with the cam also holding the locking member in operative position.

LOUIS ZAIGER.

REFERENCES CITED

The following references are of record in the file of this patent:

UNITED STATES PATENTS

| Number | Name | Date |
|---|---|---|
| 582,071 | Little | May 4, 1897 |
| 1,063,917 | Gates | June 3, 1913 |
| 1,355,757 | Elliott et al. | Oct. 12, 1920 |
| 1,646,850 | Brown | Oct. 25, 1927 |
| 2,128,068 | Anderson | Aug. 23, 1938 |
| 2,289,552 | Rousseau | July 14, 1942 |
| 2,357,280 | Smulski | Aug. 29, 1944 |
| 2,413,421 | Stoner | Dec. 31, 1946 |